June 16, 1953 A. COTSWORTH III 2,642,491
TELEVISION RECEIVER
Filed Jan. 27, 1950
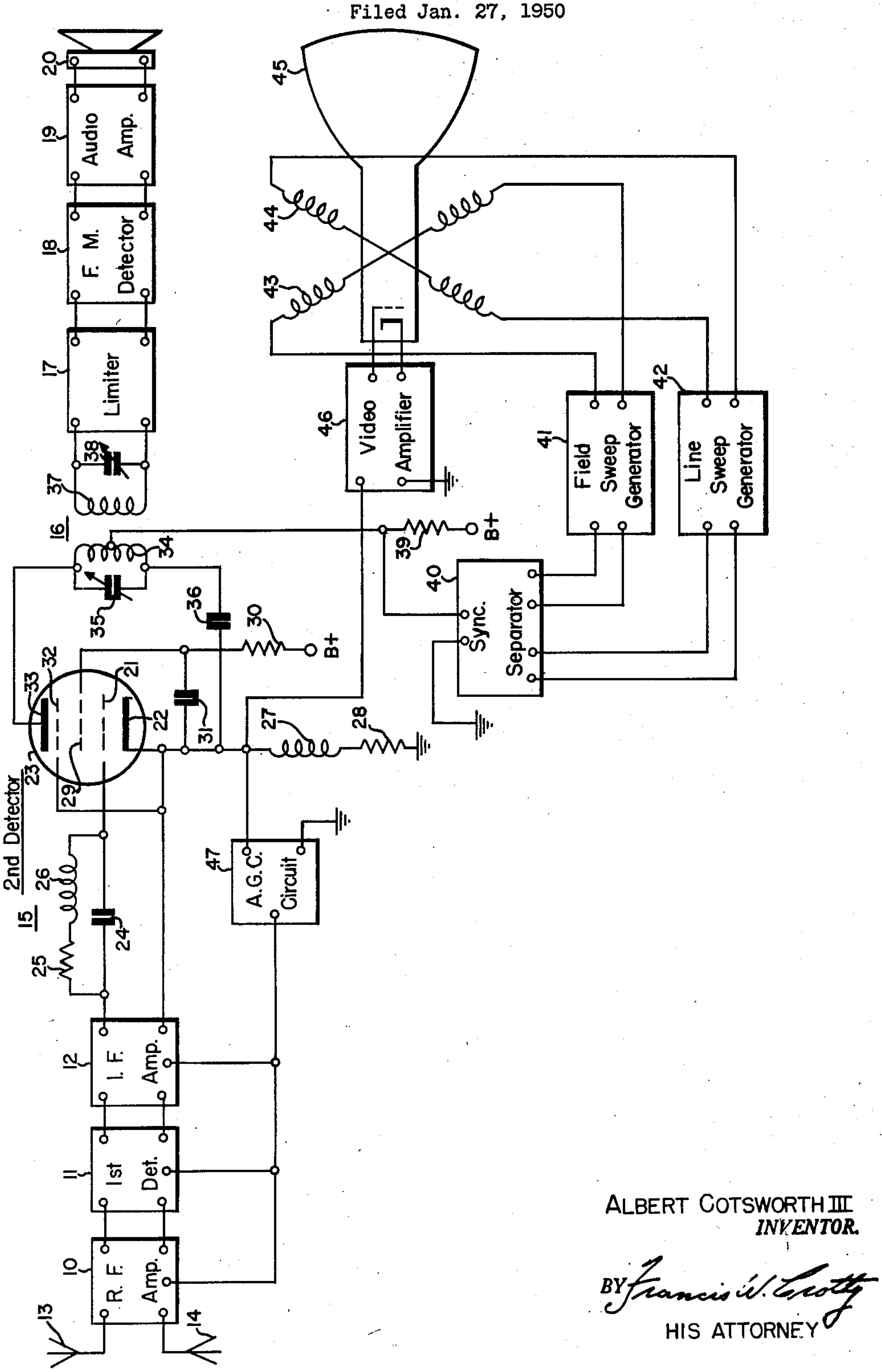
ALBERT COTSWORTH III
*INVENTOR.*
BY *Francis W. Crotty*
HIS ATTORNEY Patented June 16, 1953

2,642,491

UNITED STATES PATENT OFFICE 2,642,491

TELEVISION RECEIVER

Albert Cotsworth III, Oak Park, Ill., assignor to Zenith Radio Corporation, a corporation of Illinois Application January 27, 1950, Serial No. 140,938

3 Claims. (Cl. 178—5.8)

This invention relates to television receivers and more particularly to television receivers of the so-called "inter-carrier sound" type.

Prior to the advent of the inter-carrier sound system, the video-modulated carrier and sound-modulated carrier components of a received television broadcast were usually separated at the output of the first detector stage in a superheterodyne type of television receiver. In such prior receivers, separate intermediate-frequency channels are provided for the intermediate-frequency video and sound signals, and selective filters are used to separate the video and sound signals and direct them into their respective channels. It is necessary in these receivers to provide a highly stable heterodyning oscillator since frequency drifts of this oscillator cause incomplete separation of the intermediate-frequency components into the two channels, and undesirable interference of one with the other may result.

In an inter-carrier sound receiver, the video and sound intermediate-frequency components derived from a received television broadcast are translated through a common intermediate-frequency amplifier and both are supplied to the final video detector. Present-day standards require that the television broadcast include a first carrier-wave signal amplitude-modulated with the video information of the television program and a second carrier-wave signal frequency-modulated with the sound information thereof and frequency-displaced 4.5 megacycles from the first carrier-wave signal. Because of this frequency relation of the video and sound carriers, the video detector of a receiver of the inter-carrier sound type develops, in addition to the video-modulation components, a signal which shall be designated herein as an "inter-carrier signal," having a mean frequency of 4.5 megacycles and frequency-modulated with the sound information. This frequency-modulated inter-carrier signal may be separated from the detected video components by means of a network tuned to the mean frequency of the inter-carrier signal, and it may then be supplied to an appropriate channel for producing the sound information. The inter-carrier sound system has an advantage in that the sound intermediate-frequency channel, necessary in prior television receivers, is eliminated. This system has a further advantage in that a highly stable heterodyning oscillator is not required, since the frequency separation of the video and sound carriers is fixed, and is independent of the frequency of this oscillator.

It has been usual practice in inter-carrier sound systems to separate the frequency-modulated inter-carrier signal from the detected modulation components of the video carrier in the first video amplifier of the receiver. This practice has been subject to certain difficulties in effecting adequate separation of the detected modulation components from the frequency-modulated inter-carrier signal. In particular, it has been found that when high-gain selector circuits are employed to select the frequency-modulated inter-carrier signal, there is a strong tendency for the frequency-response characteristics of the video channel to be disturbed with the result that a portion of the frequency-modulated inter-carrier signal may be accepted by the video channel and cause a corresponding loss in amplitude and power of the inter-carrier signal directed into the sound channel.

Copending application Serial No. 103,362, entitled "Television Receiver," filed July 7, 1949, now abandoned, in the name of Robert Adler and assigned to the present assignee, discloses a network by means of which the modulation components of the video carrier may be separated from the inter-carrier component in the video amplifier without adversely affecting the frequency-response characteristic of the video channel of the receiver. The present invention preferably incorporates the network of the above-mentioned application and permits a single stage of the receiver to be utilized to perform the functions of video detection of an incoming television signal and selection of the sound-modulated inter-carrier signal from the video modulation components thereof.

It is, accordingly, an object of this invention to provide an improved television receiver of the inter-carrier sound type in which the functions of video detection of an incoming television signal and of separation of the video modulation components from the sound-modulated inter-carrier signal are performed in a single stage.

A further object of this invention is to provide such an improved television receiver in which a single stage acts to detect the video portion of an incoming television signal, to select the sound-modulated inter-carrier signal from the video modulation components, and to provide selective amplification of the video modulation components and the inter-carrier signal.

Yet another object of this invention is to provide such an improved television receiver in which a single stage acts to detect the video portion of an incoming television signal, to select the sound-modulated inter-carrier signal from the video modulation components, to provide selective amplification of the inter-carrier signal and the video modulation components, and to produce the amplified video modulation components in two separate output circuits with preselected band-widths, polarities and amplitudes which may be different as between the two output circuits.

The features of this invention which are believed to be new are set forth with particularity in the appended claims. The invention itself, however, together with further objects and advantages thereof may best be understood by reference to the following description when taken in conjunction with the accompanying drawing in which the single figure illustrates a preferred embodiment of the invention.

With reference to the accompanying drawing, the television receiver illustrated therein includes a radio-frequency amplifier 10 of one or more stages, a first detector 11 and an intermediate-frequency amplifier 12 of any desired number of stages, these components of the receiver being inter-coupled in well-known manner. The input terminals of the radio-frequency amplifier 10 may be connected to a suitable antenna circuit 13, 14. The output terminals of the intermediate-frequency amplifier 12 are connected to a second detector 15 constructed in accordance with the present invention in a manner to be described hereinafter. The second detector 15 is coupled to the sound channel of the receiver through a coupling network 16, and this sound channel may comprise an amplitude-limiter stage 17, a frequency-modulation detector 18 and an audio amplifier 19. The output terminals of the audio amplifier are connected to a sound-reproducing device 20.

The output terminals of the intermediate-frequency amplifier 12 are coupled to the control electrode 21 and cathode 22 of an electron-discharge device 23 through a capacitor 24 which is shunted by a series-connected grid-leak resistor 25 and video peaking coil 26, the device 23 being included in the second detector circuit 15. The cathode 22 of device 23 is connected to a point of reference potential through a video load impedance comprising a video peaking coil 27 series-connected to a load resistor 28. The screen electrode 29 of device 23 is connected to the positive terminal B+ of a source of unidirectional potential through a resistor 30, and this electrode is by-passed to the cathode by means of a capacitor 31 so that it is not de-generative to signals appearing in the anode circuit of the device. The suppressor electrode 32 of device 23 is connected to the cathode 22. Anode 33 is connected to one side of a tuned circuit comprising an inductance coil 34 shunted by a capacitor 35, this tuned circuit forming a portion of the coupling network 16. The other side of the tuned circuit 34, 35 is connected to cathode 22 through a capacitor 36. A further tuned circuit comprising an inductance coil 37 shunted by a capacitor 38 is included in the coupling network 16, this further tuned circuit being connected to the input terminals of the amplitude-limiter 17, and coils 34 and 37 being inductively coupled to each other.

A tap on coil 34 is connected to the positive terminal B+ of a source of unidirectional potential through a synchronizing signal load impedance comprising a resistor 39, and this tap is further connected to one of the input terminals of a synchronizing-signal separator 40. The separator 40 is connected to a field-sweep generator 41 and to a line-sweep generator 42 to control the operation of these generators in synchronism with the synchronizing components of a received television signal. The output terminals of generators 41 and 42 are connected respectively to the field and line deflection coils 43 and 44 of an image-reproducing tube 45.

The cathode 22 of device 23 is directly connected to a video amplifier 46, which, in turn, is connected to the control electrode and cathode of reproducing tube 45 to control the intensity of the cathode ray therein in accordance with the video components of the received television signal. The cathode 22 may also be connected to an automatic gain control circuit 47 which acts in well-known manner to control the amplification of the high-frequency stages of the receiver in accordance with the intensities of received television signals.

A television signal intercepted by the antenna circuit 13, 14 is amplified in the radio-frequency amplifier 10 and heterodyned to the selected intermediate-frequency of the receiver in the first detector stage 11. The resulting intermediate-frequency signal is amplified in the intermediate-frequency amplifier 12, and applied between the control electrode and cathode of device 23 of the second detector 15. It is preferred that the second detector be of the grid-leak type, as shown, so that it will respond to signals of low intensity, and for this purpose the values of resistor 25 and capacitor 24 are selected in the usual fashion so that the time constant of the network formed thereby has the proper value for grid-leak detection. Since the intermediate-frequency signal is applied directly between the control electrode and cathode of device 23, there is no degeneration and an amplified detected video signal appears across the video load impedance 27, 28. This video signal may be further amplified in video amplifier 46 and applied to the reproducing tube 45, as previously stated.

The second detector 15 also develops an inter-carrier signal produced by the inter-action of the video and sound carrier signals, and this inter-carrier signal is frequency-modulated with the sound components of the received sound carrier signal. The inter-carrier signal is amplified in device 23 and selected by means of the circuit 34, 35 which is tuned to the center or mean frequency of this signal. The capacitor 36 may be given a value corresponding to the anode-cathode capacity of device 23 and forms with the device and the tuned circuit 34, 35 a balanced bridge network, which is fully described in the aforementioned copending application. The synchronizing-signal impedance 39 forms a diagonal of the bridge network and the circuit 34, 35 may be tuned to deliver maximum inter-carrier signal to the sound channel of the receiver without disturbing the frequency-response characteristic of the synchronizing and video channels. The circuit 37, 38 is similarly tuned to the center frequency of the inter-carrier signal and supplies this signal to the amplitude limiter 17 which, in turn, applies the amplitude-limited, frequency-modulated inter-carrier signal to the frequency-modulation detector 18. The resulting audio signal from detector 18 is supplied to the sound-reproducing device 20 to enable this device to reproduce the sound intelligence.

The composite-video components of the received television signal are amplified by device 23 and developed across the synchronizing signal impedance 39. The acceptance band of the anode circuit of device 23 is inversely proportional to the value of the impedance 39. Since it is required that this impedance develop the video components with only the bandwidth required to produce the synchronizing components, the value of this impedance may be relatively low so that these synchronizing components are produced thereacross with an amplitude greater than would be possible if the full bandwidth of video components were produced at this point. The composite-video components developed across this impedance are supplied to the synchronizing-signal separator 40, and have the desired positive polarity required for synchronizing-signal separation. The composite-video components amplified by the device 23 are also developed across the video impedance 27, 28 in the cathode circuit of this device. The values of the impedances 27, 28 are made such that the band-width of the video components developed in this latter circuit is sufficiently broad to include all the desired video information of the received television signal. Yet these values are so chosen that the acceptance characteristics of this latter circuit are such that it does not select the inter-carrier signal which, by present-day standards, has a frequency outside the frequency band of the video components. The video components developed across the video impedance 27, 28 have a negative polarity. This is desirable since it prevents high-amplitude noise pulses and the like, from driving the control electrode of the discharge device in the succeeding video amplifier stage conductive and, thus, prevents corresponding distortion in the image reproduced by the device 45.

In one constructed embodiment of the invention the various elements of the receiver were given the following listed values, and these values are presented herein merely by way of example:

| | | |
|---|---|---|
| Resistor 28 | ohms | 3,000 |
| Resistor 25 | do | 4,700 |
| Resistor 30 | do | 47,000 |
| Resistor 39 | do | 10,000 |
| Coil 26 | micro-henries | 250 |
| Coil 27 | do | 150 |
| Capacitor 24 | micro-microfarads | 10 |
| Capacitor 31 | microfarads | 8 |
| Capacitor 36 | micro-microfarads | 1.5 |
| B+ | volts | 260 |

This invention provides, therefore, an improved television receiver of the inter-carrier sound type in which a single stage performs the functions of detection of a received video carrier signal, selective amplification of the video and synchronizing components thereof, and separation and selective amplification of the inter-carrier signal which is frequency modulated with the sound components of the received audio carrier signal.

While a particular embodiment of the invention has been shown and described, modifications may be made, and it is intended in the appended claims to cover all such modifications as fall within the true spirit and scope of the invention.

I claim:

1. In a television receiver for concurrently utilizing a first carrier-wave signal amplitude-modulated with video and synchronizing components and a second carrier-wave signal frequency-modulated with sound components and frequency displaced from said first signal by a predetermined amount; an amplitude-modulation detector including an electron-discharge device having an anode, a cathode and a control electrode; an input circuit connected between said control electrode and cathode for applying said first and second signals to said detector; a video load impedance connecting the junction of said input circuit with said cathode to a point of reference potential for deriving said video components for application to an image-reproducing device; a further circuit connecting said anode to the junction of said input circuit with said cathode and including a tuned circuit resonant to a heterodyne component of said first and second signals for deriving an inter-carrier signal frequency-modulated with said sound components; and a synchronizing load impedance connecting said anode to said point of reference potential for deriving said synchronizing components for application to a synchronizing system associated with said reproducing device.

2. In a television receiver for concurrently utilizing a first carrier-wave signal amplitude modulated with video and synchronizing components and a second carrier-wave signal frequency-modulated with sound components and frequency-displaced from said first signal by a predetermined amount; a grid-leak detector including an electron-discharge device having an anode, a cathode and a control electrode; an input circuit connected between said control electrode and cathode for applying said first and second signals to said detector; a video load impedance connecting the junction of said input circuit with said cathode to a point of reference potential for deriving said video components for application to an image-reproducing device; a balanced-bridge network connected between said anode and the junction of said input circuit with said cathode and including a tuned circuit resonant to a heterodyne component of said first and second signals for deriving an inter-carrier signal frequency-modulated with said sound components; and a synchronizing load impedance connecting said tuned circuit to said point of reference potential and forming a diagonal of said balanced bridge for deriving said synchronizing components for application to a synchronizing system associated with said reproducing device.

3. In a television receiver for concurrently utilizing a first carrier-wave signal amplitude-modulated with video and synchronizing components and a second carrier-wave signal frequency-modulated with sound components and frequency displaced from said first signal by a predetermined amount; an amplitude-modulation detector and wave-signal amplifier including an electron-discharge device having an anode, a cathode and a control electrode; an input circuit coupled between said control electrode and cathode for applying said first and second carrier-wave signals to said device; a frequency-selective load impedance coupled between said anode and cathode and including a tuned circuit resonant to a heterodyne component of said first and second signals for deriving an intercarrier signal frequency-modulated with said sound components; and a frequency-selective video load impedance coupled between said anode and the junction of said input circuit and cathode for deriving said video components substantially to the exclusion of said intercarrier signal.

ALBERT COTSWORTH III.

(References on following page)

References Cited in the file of this patent

UNITED STATES PATENTS

| Number | Name | Date |
|---|---|---|
| 1,660,930 | McDonald | Feb. 28, 1928 |
| 1,908,381 | Travis | May 9, 1933 |
| 2,115,825 | Morehouse | May 3, 1938 |
| 2,498,488 | Fyler | Feb. 21, 1950 |
| 2,504,662 | Dome | Apr. 18, 1950 |
| 2,505,843 | Smith | May 2, 1950 |
| 2,528,222 | Foster | Oct. 31, 1950 |

FOREIGN PATENTS

| Number | Country | Date |
|---|---|---|
| 872,431 | France | June 8, 1942 |

OTHER REFERENCES

"Television Video Handbook," Scheraga and Roche, pages 149–154, Boyce, 1949.

"Television," Zworykin and Morton, pages 546–549, Haddon Craftsman Inc., Camden, New Jersey, 1940.

"Principles of Television Engineering," Fink, pages 319–327, Maple Press Company, York, Pa., 1940.